US 7,392,942 B2

(12) United States Patent
Dragt et al.

(10) Patent No.: US 7,392,942 B2
(45) Date of Patent: Jul. 1, 2008

(54) SYSTEMS AND METHODS FOR ELECTRONIC TRANSACTION RISK PROCESSING

(75) Inventors: Bruce Dragt, Highlands Ranch, CO (US); Daniel Ahles, Houston, TX (US); Mark Wallin, Sugar Land, TX (US)

(73) Assignee: First Data Corporation, Englewood, CO (US)

( * ) Notice: Subject to any disclaimer, the term of this patent is extended or adjusted under 35 U.S.C. 154(b) by 229 days.

(21) Appl. No.: 11/313,539

(22) Filed: Dec. 20, 2005

(65) Prior Publication Data

US 2007/0138259 A1    Jun. 21, 2007

(51) Int. Cl.
G06K 5/00 (2006.01)
(52) U.S. Cl. ........................ 235/382; 235/380
(58) Field of Classification Search ................. 235/382, 235/382.5, 380, 381, 375, 492, 493
See application file for complete search history.

(56) References Cited

U.S. PATENT DOCUMENTS

| | | | |
|---|---|---|---|
| 5,679,938 A | 10/1997 | Templeton et al. | |
| 5,679,940 A | 10/1997 | Templeton et al. | |
| 5,930,777 A | 7/1999 | Barber | |
| 6,505,772 B1 | 1/2003 | Mollett et al. | |
| 6,547,132 B1 | 4/2003 | Templeton et al. | |
| 6,581,043 B1 | 6/2003 | Wallin et al. | |
| 2003/0033240 A1* | 2/2003 | Balson et al. | 705/37 |
| 2003/0093368 A1 | 5/2003 | Manfre et al | |
| 2003/0130919 A1 | 7/2003 | Templeton et al. | |
| 2003/0216987 A1 | 11/2003 | Mollett et al. | |
| 2003/0216988 A1 | 11/2003 | Mollett et al. | |
| 2003/0217014 A1 | 11/2003 | Mollett et al. | |
| 2003/0225686 A1 | 12/2003 | Mollett et al. | |
| 2004/0245330 A1 | 12/2004 | Swift et al. | |
| 2005/0125295 A1 | 6/2005 | Tidwell et al. | |
| 2005/0125296 A1 | 6/2005 | Tidwell et al. | |
| 2005/0125337 A1 | 6/2005 | Tidwell et al. | |
| 2005/0125338 A1 | 6/2005 | Tidwell et al. | |
| 2005/0125339 A1 | 6/2005 | Tidwell et al. | |
| 2005/0125350 A1 | 6/2005 | Tidwell et al. | |

(Continued)

FOREIGN PATENT DOCUMENTS

WO    WO 01/97134 A1    12/2001

(Continued)

OTHER PUBLICATIONS

Notification of Transmittal of the International Search Report and the Written Opinion of the International Searching Authority, PCT/US06/41632, dated Nov. 21, 2007.

*Primary Examiner*—Thien M Le
(74) *Attorney, Agent, or Firm*—Sutherland, Asbill & Brennan, LLP

(57) ABSTRACT

A system automatically determines authorization of a financial transaction occurring through the presentation of a check card such as a demand deposit account (DDA) card. For a proposed financial transaction of a customer from a merchant having a membership program, the system obtains an indication that the customer is a member of the merchant's membership program. The system determines an indication of risk for the transaction, based at least in part on the indication that the customer is a member of the merchant's membership program. The financial transaction is authorized when the indication of risk is within at least one parameter.

23 Claims, 6 Drawing Sheets

U.S. PATENT DOCUMENTS

| | | |
|---|---|---|
| 2005/0125351 A1 | 6/2005 | Tidwell et al. |
| 2005/0125360 A1 | 6/2005 | Tidwell et al. |
| 2006/0043169 A1* | 3/2006 | Haertel ....................... 235/379 |
| 2006/0047725 A1* | 3/2006 | Bramson .................... 707/204 |
| 2007/0061166 A1* | 3/2007 | Ramasubramanian et al. .. 705/2 |

FOREIGN PATENT DOCUMENTS

| | | |
|---|---|---|
| WO | WO 03/042790 A2 | 5/2003 |
| WO | WO 03/083751 A1 | 10/2003 |

* cited by examiner

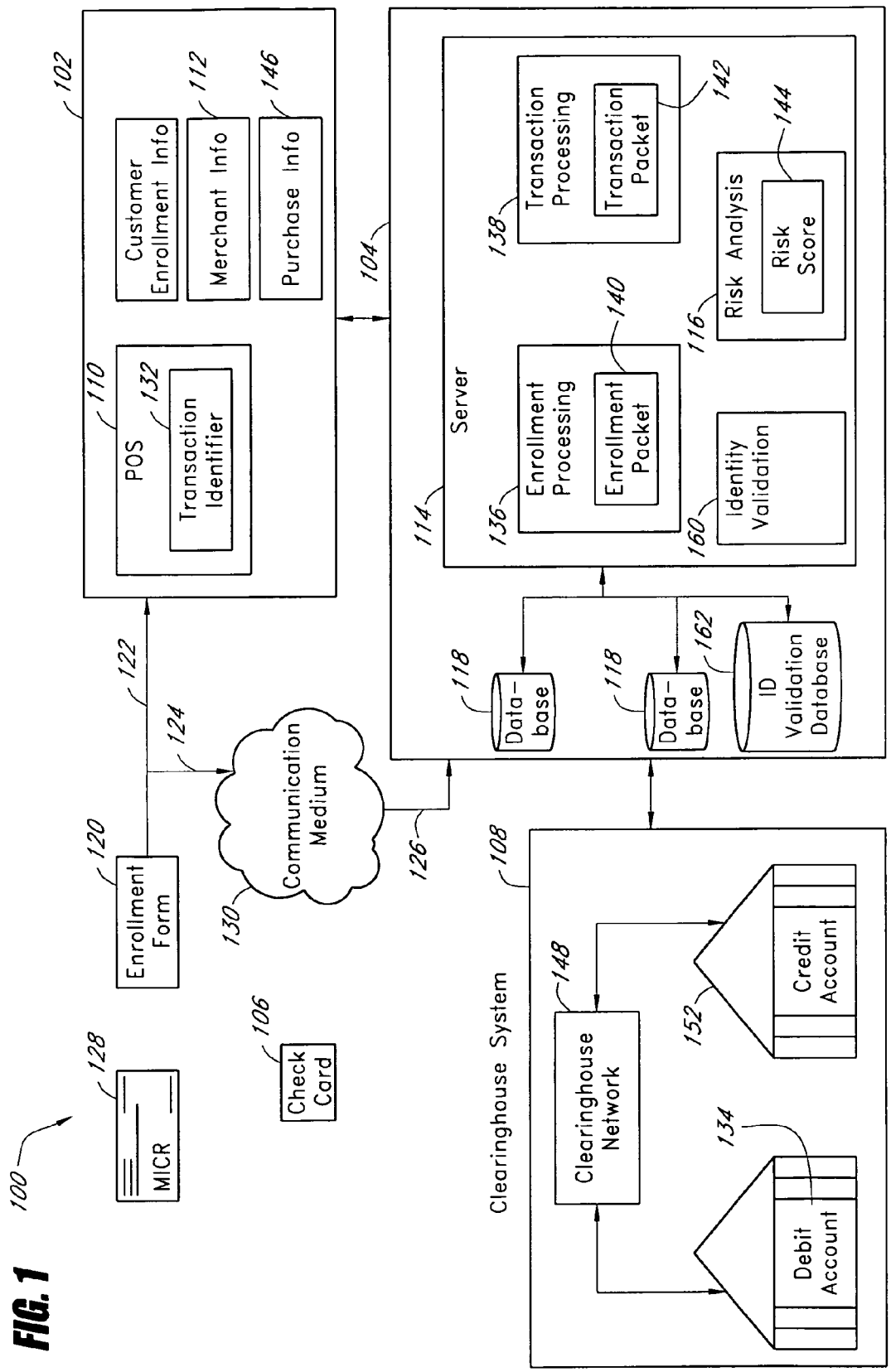

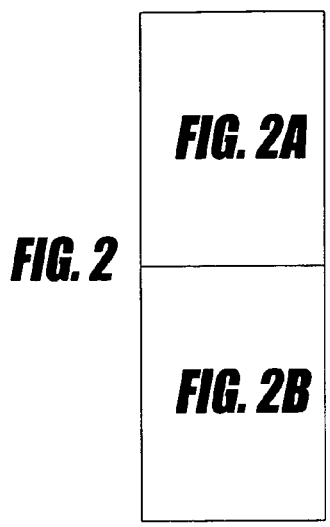
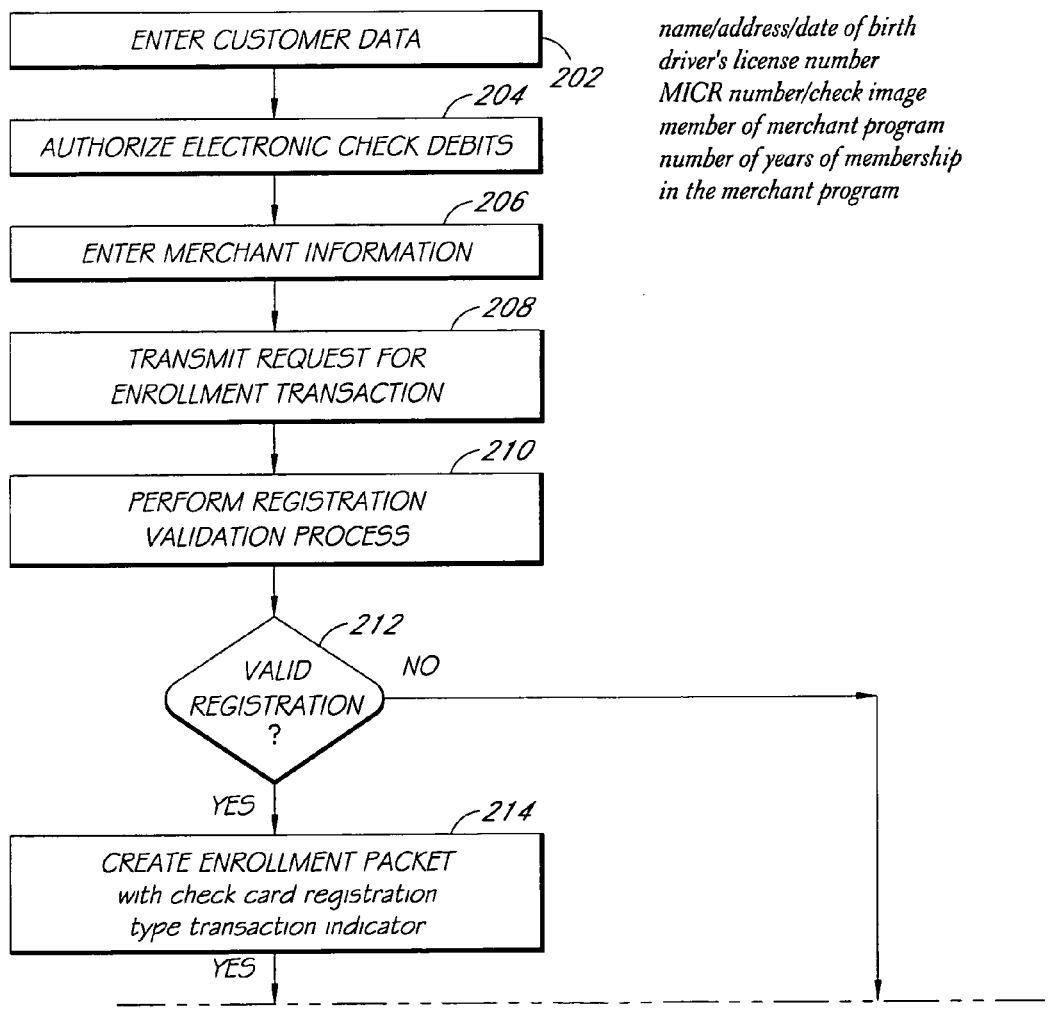
FIG. 2A

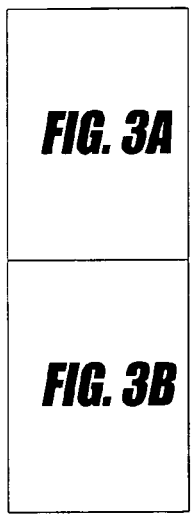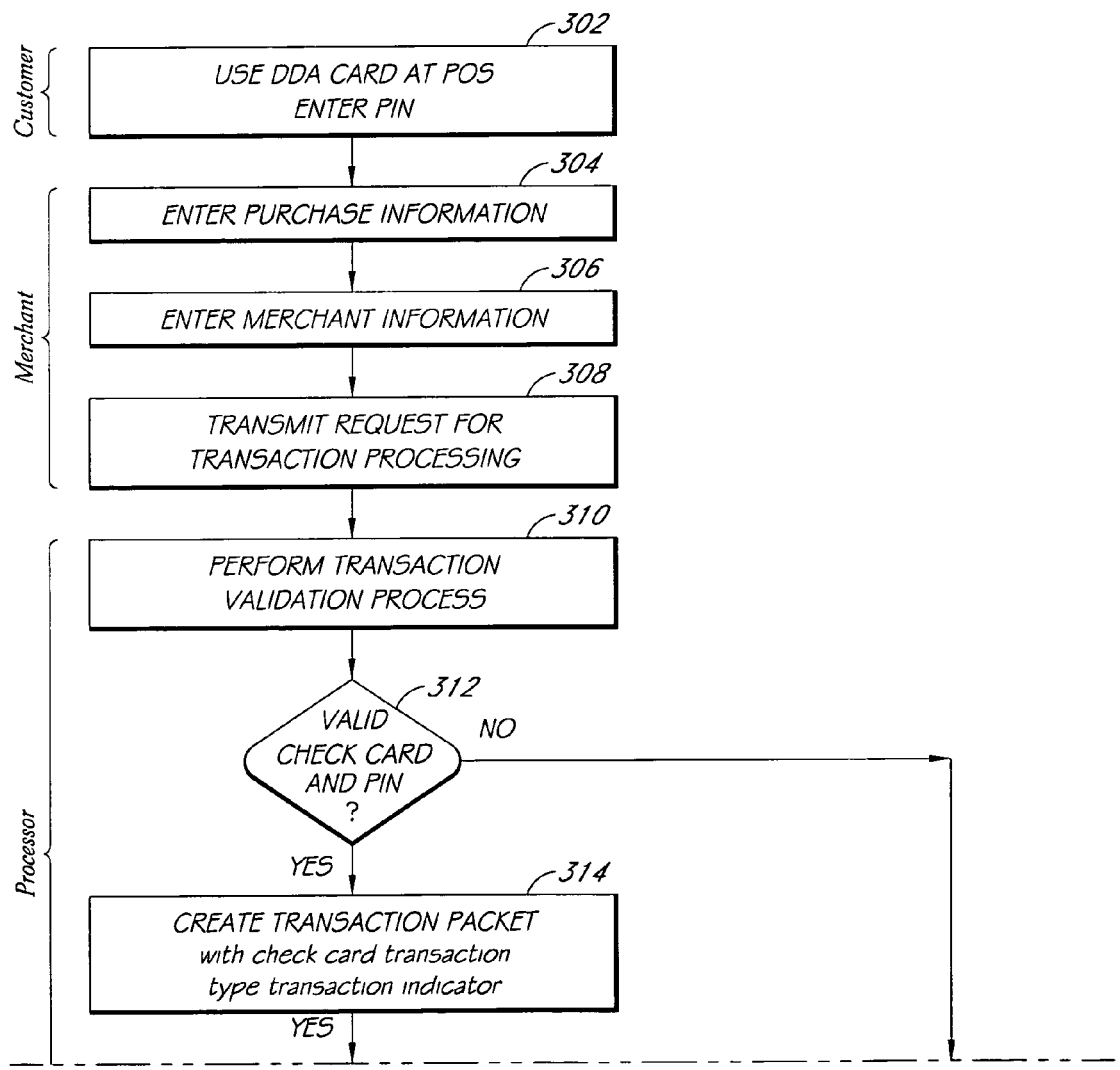
FIG. 3A

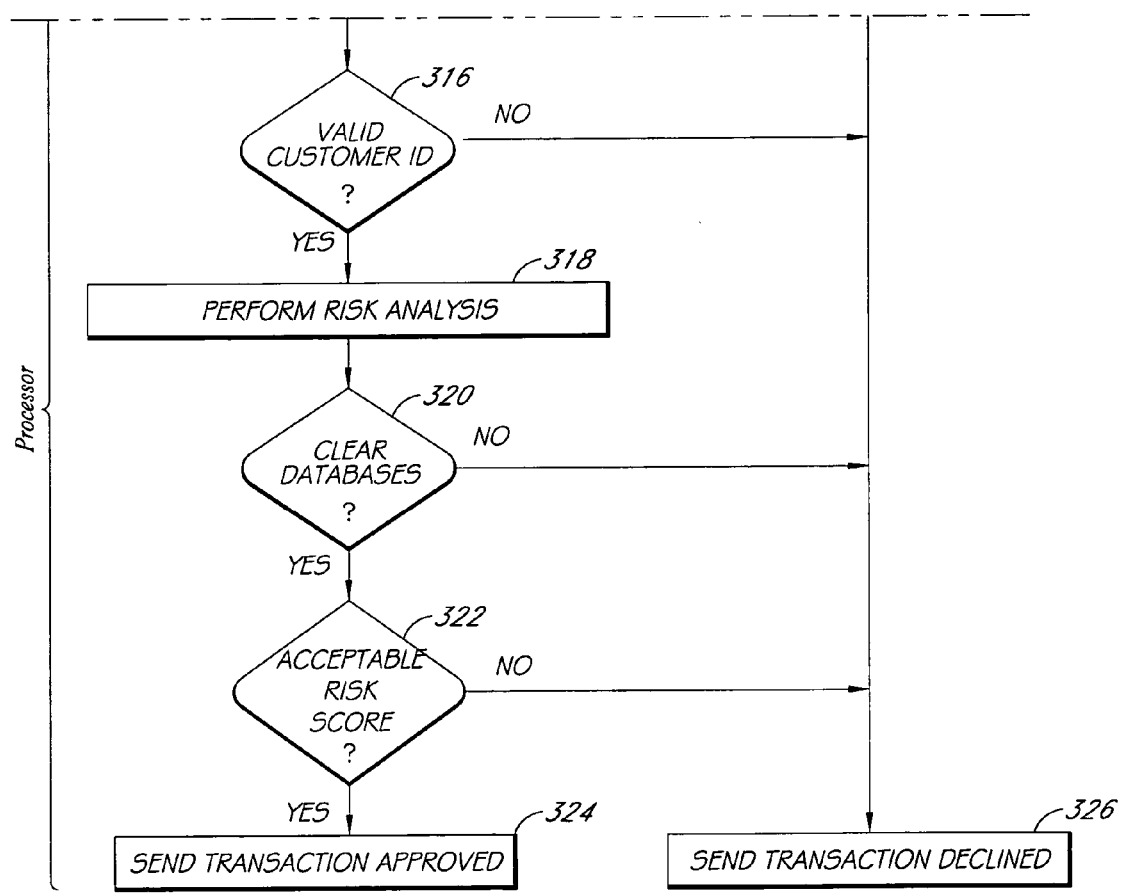

| Consumer ID Field | Description |
|---|---|
| 402 — DDA Consumer Limit 7D | The 7 day maximum that the consumers is allowed to process with their DDA/check card |
| 404 — DDA Registration SIC | SIC code of the merchant where this DDA/check card was first registered |
| 406 — DDA Registration Subscriber | Merchant code of the merchant where this DDA/check card was first registered |
| 408 — DDA Registered Flag | Indicator that indicates that this ID is associated with a DDA/check card registration |

FIG. 4

SYSTEMS AND METHODS FOR ELECTRONIC TRANSACTION RISK PROCESSING

BACKGROUND OF THE INVENTION

1. Field of the Invention

The present invention relates to the field of electronic transactions. More specifically, the invention relates to systems and methods of evaluating risk associated with electronic check transactions.

2. Description of the Related Art

Many customers are using electronic transaction technologies to pay merchants for goods and services instead of using the more traditional methods of payment, such as cash and paper checks. A debit card is one device that uses electronic transaction technology. With a debit card, a merchant knows immediately if sufficient funds exist in the customer's account to cover the payment of the goods and services.

Another electronic transaction device is a check card, such as an Automatic Clearing House (ACH) check card, which is processed electronically through the Automatic Clearing House system. One advantage for the merchant of accepting check cards is that the check card's transaction cost is less than the debit card transaction cost. However, it takes much longer to determine if sufficient funds exist in the customer's account with the check card than with the debit card.

While it is advantageous for the merchant to accept the check card to reduce costs, the merchant is taking a risk that the funds promised by the check card are not paid due to insufficient funds in the customer's account.

In order to manage financial transaction risks, some merchants subscribe to a service that accesses risk associated with financial transactions. To overcome the difficulties associated with check cards, the service may guarantee the electronic check transaction at the point of sale. The advantage to the subscribing merchant is that transactions will cost less and be substantially risk free.

SUMMARY OF THE INVENTION

Innovative systems and methods are described to reduce the risk associated with authorizing check card electronic transactions. In one embodiment, a customer pays the merchant with a card that draws funds from the customer's demand deposit account (DDA).

In an embodiment, an automated method for determining authorization of a financial transaction comprises determining whether an entity proffering a promissory payment is a member of a membership program associated with a merchant, determining a risk assessment based at least in part on whether the entity is a member of the membership program, and authorizing the financial transaction based at least in part on the risk assessment.

In another embodiment, a system for determining authorization of a financial transaction comprises an indication of whether an entity proffering a promissory payment is a member of a membership program associated with a merchant, a risk assessment based at least in part on whether the entity is a member of the membership program, and an authorization of the financial transaction based at least in part on the risk assessment.

In a further embodiment, a system for determining authorization of a financial transaction through the presentation of a check card comprises means for obtaining for a proposed financial transaction providing for the payment of goods and services from a checking account of a user through the presentation of a check card to a merchant an indication of whether the user is a member of a membership program associated with the merchant, means for determining a risk score based at least in part on the indication, and means for authorizing the financial transaction based at least in part on the risk score when the risk score is within at least one parameter.

In an embodiment, a method of enrolling a user into a system that allows the payment of goods or services through the presentation of a check card comprises acquiring information about a user that desires to enroll in a system that allows goods or services to be purchased with a check card, where the information indicates whether the user is a member of a merchant membership program, acquiring MICR (magnetic ink character recognition) data corresponding to the user's checking account, acquiring an indication of risk associated with enrolling the user, where the indication of risk is based at least in part on whether the user is a member of a membership program; and enrolling the user based at least in part on the indication of risk.

In another embodiment, an enrollment system for providing a user with a check card for the payment of goods or services comprises information from a merchant identifying a user of a checking account used for the payment of goods or services through the presentation of a check card, where the information comprises whether the user is a member of a membership program associated with the merchant, MICR data corresponding to the checking account, an indication of risk associated with accepting the user, where the indication of risk is based at least in part on whether the customer is a member of the membership program, and enrollment of the user when the indication of risk is within at least one parameter.

In a further embodiment, an enrollment system for providing a user with a check card for the payment of goods or services comprises means for acquiring information from a merchant identifying a user into a system providing for the payment of goods or services from a checking account of the user through the presentation of a check card, where the information comprises whether the user is a member of a membership program associated with the merchant, means for acquiring MICR data corresponding to the checking account, means for acquiring an indication of risk associated with accepting the user, where the indication of risk is based at least in part on whether the customer is a member of the membership program, and means for enrolling the user when the indication of risk is within at least one parameter.

In an embodiment, a data packet for use in a financial transaction comprises an indication of whether an entity proffering a promissory payment is a member of a membership program associated with a merchant, and where the data packet is transmitted to a transaction authorization service.

In another embodiment, a method of accessing the risk of a financial transaction comprises indicating in a data packet for a proposed financial transaction whether an entity proffering a promissory payment is a member of a membership program associated with the merchant, and transmitting the data packet to a transaction authorization service.

In a further embodiment, a point-of-sale device comprises a communication interface, and processor circuitry in communication with the communication interface, the processor circuitry configured to generate a transaction code associated with a promissory payment proffered by an entity, the processor circuitry further configured to transmit via the communication interface the transaction code to a transaction authorization service for use in accessing a risk of the promissory payment, and where the transaction code is used to identify whether the entity is a member of a membership program associated with a merchant, and where the risk assessment is based at least in part on the transaction code.

In a yet further embodiment, a method of processing a financial transaction with a point of sale device comprises generating a transaction code for a proposed financial transaction in response to the presentation of a check card by an entity, and transmitting the transaction code to a transaction authorization service for use in accessing a risk of the proposed financial transaction, where the transaction code identifies whether the entity is a member of a membership program associated with a merchant, and where the risk is based at least in part on the transaction code.

In another embodiment, a point-of-sale device comprises means for generating a transaction code for a proposed financial transaction in response to the presentation of a check card by an entity, and means for transmitting the transaction code to a transaction authorization service for use in accessing a risk of the proposed financial transaction, where the transaction code identifies whether the entity is a member of a membership program associated with a merchant, and where the risk is based at least in part on the transaction code.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements.

FIG. 1 is a block diagram of an exemplary DDA card enrollment and DDA transaction processing system, according to an embodiment of the invention.

FIG. 3 illustrates a check card transaction process, according to an embodiment of the invention.

FIG. 4 is an exemplary set of consumer identification factors used to generate a check card transaction risk analysis, according to an embodiment of the invention.

DETAILED DESCRIPTION OF THE PREFERRED EMBODIMENT

Figure 2B:
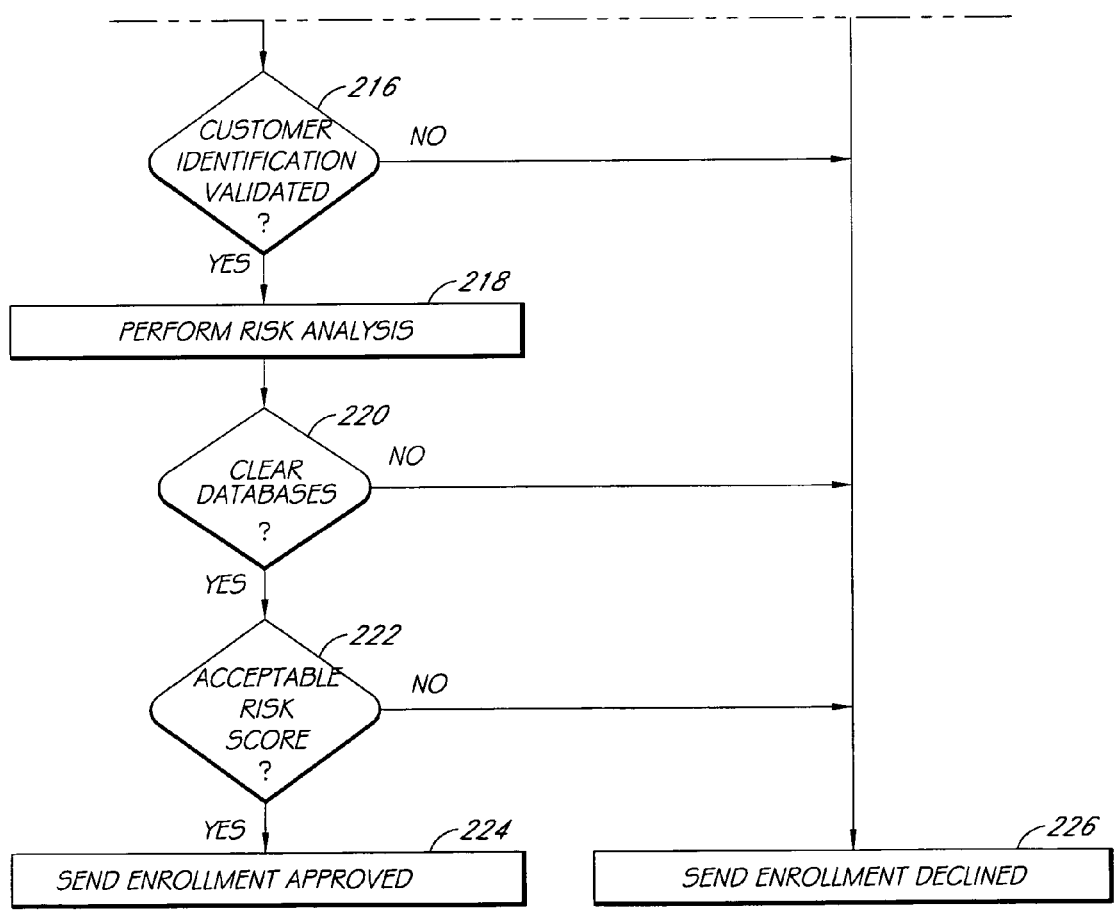
FIG. 2 illustrates a check card enrollment process, according to an embodiment of the invention.

Many times a payment for goods and/or services to a merchant is in a promissory form that instructs the customer's bank to pay the merchant from a demand deposit account (DDA). A DDA is an account, such as a checking account, whose balance can be drawn upon on demand, for example, without prior notice. Paper checks and check cards are examples of promissory payments. Other examples of promissory payments can include IOUs, credit transactions, credit cards, promissory notes, and the like.

The term "electronic check" is used to refer to several types of electronic transactions including but not limited to ACH-based electronic checking, network based electronic checking, promissory payments proffered electronically, debits initiated over the Internet or via the telephone, or the like. In ACH-based electronic checking, a payment begins as a paper check and is converted into an electronic transaction.

With network based electronic checking, a payment begins as a paper check, and is converted into, or truncated to, an electronic network entry, using networks such as an ATM network or a credit card network. The paper check is not processed.

Promissory payments proffered electronically, such as transactions initiated with a check card, begin as an electronic transaction.

With transactions that are initiated over the Internet or via the telephone, the debit is carried out by an electronic debit, usually an ACH debit. Some users categorize payments initiated via Internet or telephone but effected by paper drafts as electronic checks, even though the debit is paper-based. Electronic checking can be a catch-all term used loosely to refer to any attempt to initiate payment through PCs, the Internet, and computer systems.

To reduce the risk associated with authorizing check card electronic transactions, a check guarantee service uses a transaction system to access the risk of accepting a customer's application for a check card where the customer is a member of a membership program, customer loyalty program, or the like associated with a merchant.

Further, the check guarantee service uses the transaction system to access the risk of accepting a transaction from the customer using the check card as a guarantee of payment. The risk is based at least in part on whether the customer is a member of a merchant program.

A customer provides registration information to enroll in a check card program to permit the purchase of goods and services from a merchant upon presentation of a check card. The registration information comprises an indication of whether the customer is a member of the merchant membership program and how long the customer has been a member.

The merchant system receives the enrollment information, and generates a transaction code. The transaction code indicates the transaction is an enrollment transaction for a check card and the customer is a member of the merchant membership program. The merchant system sends the enrollment information, the transaction code, and merchant information to a transaction system.

The transaction system evaluates the risk of enrolling the customer in the check card program, based at least in part on whether the customer is member of the merchant membership program. If the risk is within at least one parameter, the transaction system notifies the merchant system that the customer's enrollment has been accepted. In an embodiment, the parameter is a predetermined parameter. In another embodiment, the parameter is determined during the enrollment risk evaluation.

In an embodiment, the merchant system issues the check card to the customer. In another embodiment, the check guarantee service issues the check card to the customer. In another embodiment, the check card is a virtual check card issued to the customer over a communications medium, such as the Internet. The check card is used to create electronic checking transactions from the customer's direct debit account, such as the customer's checking account. The check card is also associated with the merchant membership program.

Upon presentation of the check card at the merchant system for the purchase of goods or services, the merchant system generates a transaction code. The transaction code indicates the transaction is a purchase transaction using a check card and the check card is associated with a merchant membership program. The merchant system sends the transaction information, the transaction code, and merchant information to the transaction system.

The transaction system evaluates the risk of the transaction, based at least in part on whether the check card is associated with a merchant membership program. If the risk is within at least one parameter, the transaction system notifies the merchant system that the transaction is approved. In an embodiment, the parameter is a predetermined parameter. In another embodiment, the parameter is determined during the transaction risk evaluation. The transaction system communicates with a clearinghouse system to debit the customer's debit account and credit the merchant's account for the amount of the purchase through an electronic checking transaction.

FIG. 1 is a block diagram of an exemplary check card enrollment and check card transaction processing system 100. The check card enrollment and processing system 100 comprises a merchant system 102 and a transaction system 104. The merchant system 102 and the transaction system 104 are designed to communicate with each other. FIG. 1 also shows the transaction system 104 communicating with a clearinghouse system 108. According to one embodiment, at least the merchant system 102, the transaction system 104, and the clearinghouse system 108 communicate with one another through one or more communication links.

The merchant system 102 comprises a point-of-sale device 110 and merchant information 112. In an embodiment, the point-of-sale device 110 comprises a keyboard, a display, a MICR reader, a magnetic stripe reader, a communication interface and a computer processor in communication with the communication interface.

The transaction system 104 comprises one or more server systems 114 communicating with one of more database collections 118 to determine whether to authorize particular transactions presented by the merchant system 102. In another embodiment, the database collection 118 can be provided by a third party data provider.

The database collection 118 can comprise one or more logical and/or physical data storage systems for storing the data used by the server 114. In an embodiment, the database 118 comprises a historical transaction database 118. The historical transaction database 118 stores information about the customer's financial history, and may include transaction data from transactions processed by the server 114, other systems, credit reporting companies, or other commercially available databases. The historical transaction database 118 can include information from, for example, credit reports, online activity by the customer, other customer data, and the like. The historical transaction database 118 can comprise multiple databases, such as, for example, a positive database storing positive risk information, and negative databases storing high-risk information or names of otherwise unqualified individuals.

In an embodiment, the database 118 also comprises a MICR (magnetic ink character recognition) line conversion database 118. The MICR line conversion database 118 includes information regarding the formatting of transactions submitted to the clearinghouse system 108. For example, the MICR line conversion database 118 can include historical and other information regarding the placement and use of differing MICR characters by various banking institutions or check printing companies, thereby providing the transaction system 104 with conversion information for converting the customer entered checking account data, such as the MICR line, into, for example, electronic debit or credit transactions.

The server system 114 comprises enrollment processing server code 136, transaction processing server code 138, and risk analysis server code 116. The server code 116, 136, 138 includes one or more software processes or program logic designed to execute on the server systems 114. In one embodiment, the server code 116, 136, 138 may advantageously include software or hardware components such as software object-orientated components, class components, task components, processes methods, functions, attributes, procedures, subroutines, segments of program code, drivers, firmware, microcode, circuitry, data, databases, data structures, tables, arrays and variables.

As shown in FIG. 1, the transaction system 104 comprises the enrollment server code 136 for processing enrollment data and generating an enrollment packet 140, the transaction processing code for processing transaction data and generating a transaction packet 142, and the risk analysis code 116 which returns a risk score 144.

FIG. 2 illustrates a check card enrollment process 200, according to an embodiment of the invention. Referring to FIGS. 1 and 2, a customer provides registration information 120 to enroll in a check card program to acquire a check card 106 in block 202. In an embodiment, the customer registers at a merchant location, as indicated by path 122. The customer's information comprises, but is not limited to, name, address, phone number, date of birth, social security number, drivers license number, and the like. The customer's information further comprises whether the customer is a member of the merchant's membership program, and how long the customer has been a member of the merchant's membership program.

The customer's information is captured at the point-of-sale device 110. In an embodiment, the information is captured using the keyboard and display associated with the point-of-sale device 110.

The customer authorizes electronic checking transactions in block 204 by providing a bank number, account number, MICR data, or other information to identify a debit account 134. Use of the check card 106 generates an electronic checking transaction to the debit account 134. In an embodiment, the point-of-sale device 110 magnetically reads MICR (magnetic ink character recognition) data from a check 128 associated with the customer's debit account 134 and captures the check image. The point-of-sale device 110 also captures the customer's driver's license number either by keying the number from the driver's license using the keyboard or by swiping the driver's license through the card reader.

The point-of-sale device 110 generates a transaction code or identifier 132, which identifies the transaction as an enrollment for a check card in which the customer is a member of a membership program associated with the merchant.

The merchant system 102 further comprises merchant information 112, which identifies the merchant to the transaction system 104 in block 206. The merchant information 112 comprises, but is not limited to, a merchant identifier, merchant business type, merchant address, and the like.

The customer information 120, the merchant information 112, and the transaction code or identifier 132 comprise enrollment information. The merchant system 102 sends the enrollment information in a data packet and the request for enrollment approval to the transaction system 104 in block 208.

In another embodiment, the customer registers through a website via a communication medium 130 as indicated by paths 124, 126. The transaction system 104 receives the enrollment information from the website.

The communication medium 130 as shown in FIG. 1, in one embodiment, is the Internet, which is a global network of computers. In other embodiments, the communications medium 130 can be any communication system including by way of example, dedicated communication lines, telephone networks, wireless data transmission systems, two-way cable systems, customized computer networks, interactive kiosk networks, automatic teller machine networks, interactive television networks, and the like.

The transaction system 104 receives the enrollment information. In block 210, the transaction system 104 performs a registration validation process. The transaction system 104 searches for existing registrations for the customer based on at least one of the bank number, drivers license number, social security number, name, address, and the like. In an embodiment, the transaction system 104 uses the databases 118 to search for existing registrations. The transaction system 104 confirms that the customer's name, address and phone number are the same as the information provided in the enrollment information.

If, in block 212, the customer has an active registration for this merchant, the transaction system 104 declines the enrollment in block 226.

If, in block 212, the databases 118 show that the customer has been blocked from registrations, the transaction system 104 declines the enrollment in block 226.

If the customer has an existing registration from another merchant, or the transaction system 104 does not find a match in the databases 118, the transactions system 104 proceeds with the enrollment processing 136 and generates an enrollment packet 140 in block 214.

In an embodiment, the enrollment packet 140 includes, but is not limited to, the MICR number, drivers license number, social security number, date of birth, name address, phone number, check number, a subscriber code associated with the merchant, and an indication that the customer is a member of the merchant membership program.

In an embodiment, the transaction system 104 validates the customer identification in block 216. The transaction system 104 applies an identity validation process 160 to identify and eliminate suspicious registration attempts. The identity validation process 160 looks at and updates an identity validation database 162.

In block 218, the transaction system 104 performs the risk analysis 116 to determine the amount of risk in accepting the customer's enrollment for the check card 106. The risk analysis 116 uses risk factors unique to a transaction request, such as an enrollment transaction, a purchase transaction, or the like, for a check card associated with a membership program. An indication of risk can be based, at least in part, on whether the customer is a member of a merchant membership program. Other risk factors are, but not limited to, at least one of a success rate of prior electronic transactions associated with the customer, a success rate of prior ACH transactions associated with the customer, a historical risk associated with ACH transactions, and a risk associated with a financial institution associated with the checking account.

FIG. 4 illustrates an exemplary set of consumer identification factors used in generating the check card transaction risk analysis 116 and is discussed in more detail below.

In an embodiment, the risk analysis 116 searches databases 118 such as, negative databases, positive databases, historical databases, and the like in block 220.

In an embodiment, the risk analysis 116 formats at least one valid transaction from the data associated with the customer's checking account 134 and processes the transaction to the clearinghouse system 108 as an electronic debit or credit to the checking account 134. Upon receiving confirmation that the transaction was properly settled, the risk analysis 116 uses the confirmation in the determination of whether to enroll the customer.

In block 222, the risk analysis code or engine 116 generates the indication of risk or the risk score 144, based at least in part, on whether the customer is a member of a membership program associated with the merchant.

The transaction system 104 accepts the customer's enrollment when the indication of risk or the risk score is within at least one parameter. In an embodiment, the parameter is a predetermined parameter. In another embodiment, the parameter is determined during the generation of the risk score. In an embodiment, the indication that the customer is a member of the merchant membership program increases the risk score 144 by an amount. In another embodiment, the indication that the customer is a member of the merchant membership program decreases the risk threshold by an amount. In an embodiment, the amount is a predefined amount. In another embodiment, the amount is determined during the generation of the risk score.

If the risk score is within at least one parameter in block 222, the transaction system 104 notifies the merchant system 102 to accept the customer's enrollment in block 224. In an embodiment, the merchant presents the customer with the check card 106. In another embodiment, the check guarantee service presents the customer with the check card 106.

If the customer identification or registration is invalid (block 216), the enrollment information does not clear the databases (block 220), or the risk score is not within at least one parameter (block 222), the transaction system 104 sends the merchant system 102 an enrollment declined message in block 226.

FIG. 3 illustrates a check card transaction process 300, according to an embodiment of the invention. Referring to FIGS. 1 and 3, the customer presents the check card 106 at a point-of-sale to pay for goods and/or services. In an embodiment, the customer uses the check card 106 and enters a personal identification number (PIN) into the point-of-sale device 110 in block 302. The check card 106 is associated with a merchant membership program as described above. In an embodiment, the membership program associated with the check card 106 is also associated with the merchant at the point-of-sale. In another embodiment, the membership program associated with the check card 106 is not associated with the merchant at the point-of-sale.

In block 304, purchase information 146 is captured at the point-of-sale device 110. The purchase information includes, but is not limited to, customer name, address, phone number, driver's license number, item purchased, amount, date of purchase, time of purchase, check card number, and the like.

In an embodiment, the information is captured using the keyboard and display associated with the point-of-sale device 110. A card reader associated with the point-of-sale device 110 magnetically reads the account information from the check card 106. The point-of-sale device 110 also captures the customer's driver's license number either by keying the number from the driver's license using the keyboard or by swiping the driver's license through the card reader.

The point-of-sale device 110 generates the transaction code or identifier 132, which identifies the transaction as a purchase transaction for the check card 106 in which the customer is a member of a merchant membership program.

The merchant system 102 further comprises the merchant information 112, which identifies the merchant to the transaction system 104 in block 306. The merchant information 112 comprises, but is not limited to, a merchant identifier, merchant business type, merchant address, and the like.

The purchase information 146, the merchant information 112, and the transaction code or identifier 132 comprise transaction information. The merchant system 102 sends the transaction information in a data packet and the request for transaction approval to the transaction system 104 in block 308.

In another embodiment, the customer uses the check card 106 and enters a PIN at a website. The website via the communication medium 130 sends the transaction information to the transaction system 104 as indicated by the paths 124, 126.

The transaction system 104 receives the transaction information. In block 310, the transaction system 104 performs a transaction validation process to validate the check card number and PIN. If the PIN is incorrect in block 312, the transaction system 104 declines the transaction in block 326.

After the transaction system 104 confirms the check card number and PIN in block 312, the transaction system 104 proceeds with the transaction processing 138 and generates a transaction packet 142 in block 314.

In an embodiment, the transaction packet 142 includes, but is not limited to, the MICR number, check number, the drivers license number, social security number, date of birth, amount, check card number, a registration identifier for the customer, the subscriber code for the merchant, and an indication that the customer is a member of the merchant membership program.

The transaction system 104 verifies the customer identification in block 316. In an embodiment, verifying the customer identification comprises at least one of verifying the customer's drivers license number, verifying the customer's social security number, and verifying the MICR number associated with the customer's checking account.

In block 318, the transaction system 104 performs the risk analysis 116 to determine an indication of the risk in accepting the customer's transaction using the check card 106. The risk analysis 116 uses risk factors unique to a transaction request, such as an enrollment transaction, a purchase transaction, or the like, for a check card associated with a membership program. An indication of risk can be based, at least in part, on whether the customer is a member of a merchant membership program. Other risk factors are, but not limited to, at least one of a success rate of prior electronic transactions associated with the customer, a success rate of prior ACH transactions associated with the customer, a historical risk associated with ACH transactions, and a risk associated with a financial institution associated with the checking account.

FIG. 4 illustrates an exemplary set of consumer identification factors used to generate the check card transaction risk analysis 116, and is discussed further below.

In an embodiment, the risk analysis 116 searches databases 118, such as negative databases, positive databases, historical databases, and the like, in block 320.

In block 322, the risk analysis code or engine 116 generates the indication of risk or the risk score 144, based at least in part, on whether the customer is a member of the merchant membership program.

The transaction system 104 accepts the customer's transaction when the indication of risk or the risk score 144 is within at least one parameter. In an embodiment, the parameter is a predetermined parameter. In another embodiment, the parameter is determined during the generation of the risk score. In an embodiment, the indication that the customer is a member of the merchant membership program increases the risk score 144 by a amount. In another embodiment, the indication that the customer is a member of the merchant membership program decreases the risk threshold by a amount. In an embodiment, the amount is a predetermined amount. In another embodiment, the amount is determined during the generation of the risk score.

If the risk score 144 is within at least one parameter in block 322, the transaction system 104 notifies the merchant system 102 to accept the customer transaction in block 324.

If the customer identification is invalid (block 316), the enrollment information does not clear the databases (block 320), or the risk score is not within at least one parameter (block 322), the transaction system 104 sends the merchant system 102 an enrollment declined message in block 326.

Referring to FIG. 1, the transaction system 104 further communicates the transaction as an electronic checking transaction to the clearinghouse system 108. In an embodiment, the clearinghouse system 108 comprises the national ACH (Automated Clearing House) network 148. Generally, the ACH network 148 can accept electronic ACH debit and credit transactions against, for example, the customer's debit account 134. When the transaction system 104 settles a transaction between the customer and the merchant, the server 114 advantageously formats at least one electronic ACH debit transaction debiting the customer's debit account 134 and crediting a credit account 152. The electronic ACH debit and credit transactions are then transferred into the national ACH network 148 as electronic transactions. Rules for the format and content of the electronic ACH debit and credit transactions are governed by NACHA (National Automated Clearing House Association) and considered within the scope and knowledge of a skilled artisan within the electronic banking industry.

Although the clearing system 108 is disclosed with reference to this embodiment, the invention is not intended to be limited thereby. Rather, a skilled artisan recognizes from the disclosure herein a wide number of alternatives to the clearinghouse system 108. For example, the clearinghouse system 108 may comprise one of more private institutions that have developed a network for clearing electronic transactions between users. Such private institutions generally promulgate rules governing the type and content of electronic transaction submissions.

A wide variety of methods, including ruled-based, statistical, and other methods, is available for use, alone or in combination, to construct the risk determination system. For example, the risk determination may be created using one or more statistical methodologies, including, for example, logistic regression, linear regression, discriminant analysis, or some other modeling technique such as fuzzy logic systems, feed-forward neural networks, Bayesian or other probabilistic system. The risk determination system 116 uses consumer identification factors to determine a risk score that indicates the determined likelihood that the promissory transaction made with a check card associated with a merchant membership program will fail.

As described above, a variety of factors may influence a determination of whether a transaction is to be accepted or denied. Furthermore, systems will vary the weight afforded to different factors, may exclude, or ignore certain factors while emphasizing other factors. Thus, the following consumer identification factors can be considered individually or in combination when performing the risk analysis 116.

FIG. 4 illustrates an exemplary set of consumer identification factors comprising a DDA consumer limit 7D 402, a DDA registration SIC 404, a DDA registration subscriber 406, and a DDA registered flag 408, which are used, at least in part, to generate the check card transaction risk analysis 116 in blocks 218 and 318. The factors 402-408 are defined as follows.

The DDA consumer limit 7D factor 402 is the seven-day maximum amount that the consumer is permitted to process with their DDA/check card.

The DDA registration SIC factor 404 is the standard industry code of the merchant where the DDA/check card was first registered.

The DDA registration subscriber factor 406 is the merchant code of the merchant where the DDA/check card was first registered.

The DDA registered flag 408 is an indicator that indicates that the customer is associated with a DDA/check card registration.

As discussed above, a wide variety of methods, including ruled-based, statistical, and other methods, is available for use, alone or in combination, to construct the risk determination system. For example, the risk determination may be created using one or more statistical methodologies, including, for example, logistic regression, linear regression, discriminant analysis, or some other modeling technique such as fuzzy logic systems, feed-forward neural networks, Bayesian or other probabilistic system. The risk determination system 116 uses the risk variables to determine a risk score that indicates the determined likelihood that the promissory transaction made with a check card associated with a merchant membership program will fail.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A computerized method for determining authorization of a financial transaction comprising:
   determining whether an entity proffering a promissory payment associated with a demand deposit account is a member of at least one or more membership programs associated with at least one merchant, where entities who are not members of at least one of the membership programs can still proffer promissory payments to conduct financial transactions;
   determining a risk assessment based at least in part on whether the entity is a member of at least one of the membership programs; and
   authorizing the financial transaction based at least in part on the risk assessment.

2. The method of claim 1 wherein the promissory payment is associated with a demand deposit account.

3. The method of claim 1 further comprising obtaining an indication of whether the entity is a member of at least one of the membership programs.

4. The method of claim 3 wherein the indication is a transaction code.

5. The method of claim 3 wherein the indication indicates whether the entity is a member of a membership program associated with another merchant.

6. The method of claim 3 wherein the indication further indicates how long the entity has been a member of the membership program.

7. The method of claim 1 wherein the risk assessment is further based at least in part on at least one of a success rate of prior electronic transactions associated with the entity, a success rate of prior ACH transactions associated with the entity, a historical risk associated with ACH transactions, and a risk associated with a financial institution associated with the entity's financial account.

8. The method of claim 1 wherein the financial transaction is an enrollment request.

9. The method of claim 1 further comprising obtaining for a proposed financial transaction entity information and merchant information.

10. The method of claim 1 wherein the promissory payment is an electronic check transaction.

11. A system for determining authorization of a financial transaction comprising:
    an indication of whether an entity proffering a promissory payment is a member of at least one or more membership programs associated with at least one merchant, where entities who are not members of at least one of the membership programs can still proffer promissory payments to conduct financial transactions;
    a risk assessment based at least in part on whether the entity is a member of at least one of the membership programs; and
    an authorization of the financial transaction based at least in part on the risk assessment.

12. The system of claim 11 wherein the promissory payment is associated with a demand deposit account.

13. The system of claim 11 wherein the indication indicates whether the entity is member of a membership program associated with another merchant.

14. The system of claim 11 wherein the indication further indicates how long the entity has been a member of the membership program.

15. The system of claim 11 wherein the risk assessment is further based at least in part on at least one of a success rate of prior electronic transactions associated with the entity, a success rate of prior ACH transactions associated with the entity, a historical risk associated with ACH transactions, and a risk associated with a financial institution associated with the entity's financial account.

16. The system of claim 11 wherein the financial transaction is an enrollment request.

17. A system for determining authorization of a financial transaction through the presentation of a check card comprising:
    means for obtaining for a proposed financial transaction providing for the payment of goods and services from a checking account of a user through the presentation of a check card to a first merchant an indication of whether the user is a member of one or more membership programs associated with at least one of the first and a second merchant, where at least the first merchant sells goods and services to users who are not members of the one or more membership programs;
    means for determining a risk score based at least in part on the indication; and
    means for authorizing the financial transaction based at least in part on the risk score when the risk score is within at least one parameter.

18. The system of claim 17 wherein the indication is a transaction code.

19. The system of claim 17 wherein the indication further indicates how long the user has been a member of the membership program.

20. The system of claim 17 wherein the financial transaction is an enrollment transaction.

21. A method of enrolling a user into a system that allows the payment of goods or services through the presentation of a check card, the method comprising:

acquiring information about a user that desires to enroll in a system that allows goods or services to be purchased with a check card, wherein the information indicates whether the user is a member of at one or more merchant membership programs, where users who are not members of at least one of the membership programs can still purchase goods or services with a check card;

acquiring MICR data corresponding to the user's checking account;

acquiring an indication of risk associated with enrolling the user, wherein the indication of risk is based at least in part on whether the user is a member of at least one of the membership programs; and enrolling the user based at least in part on the indication of risk.

22. A data packet for use in a financial transaction, the data packet comprising:

an indication of whether an entity proffering a promissory payment is a member of one or more membership programs associated with at least one merchant; where entities who are not members of at least one of the membership programs can still proffer promissory payments to conduct financial transactions and wherein the data packet is transmitted to a transaction authorization service.

23. A point-of-sale device comprising:

a communication interface; and processor circuitry in communication with the communication interface, the processor circuitry configured to generate a transaction code associated with a promissory payment proffered by an entity;

the processor circuitry further configured to transmit via the communication interface the transaction code to a transaction authorization service for use in accessing a risk of the promissory payment; and wherein the transaction code is used to identify whether the entity is a member of at least one or more membership programs associated with at least one merchant, where entities who are not members of at least one of the membership programs can still proffer and have accepted promissory payments, and wherein the risk assessment is based at least in part on the transaction code.

* * * * *